Feb. 26, 1963
A. S. SHEA
3,078,963
EMERGENCY BRAKE
Filed Oct. 20, 1961
2 Sheets-Sheet 1
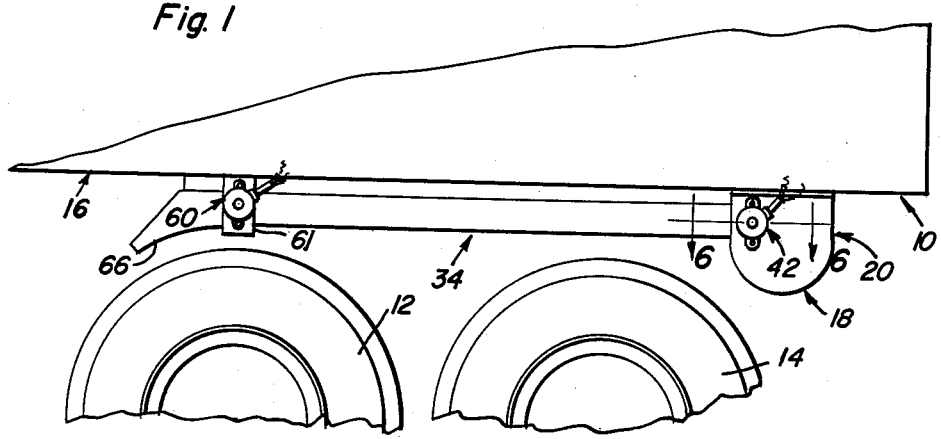
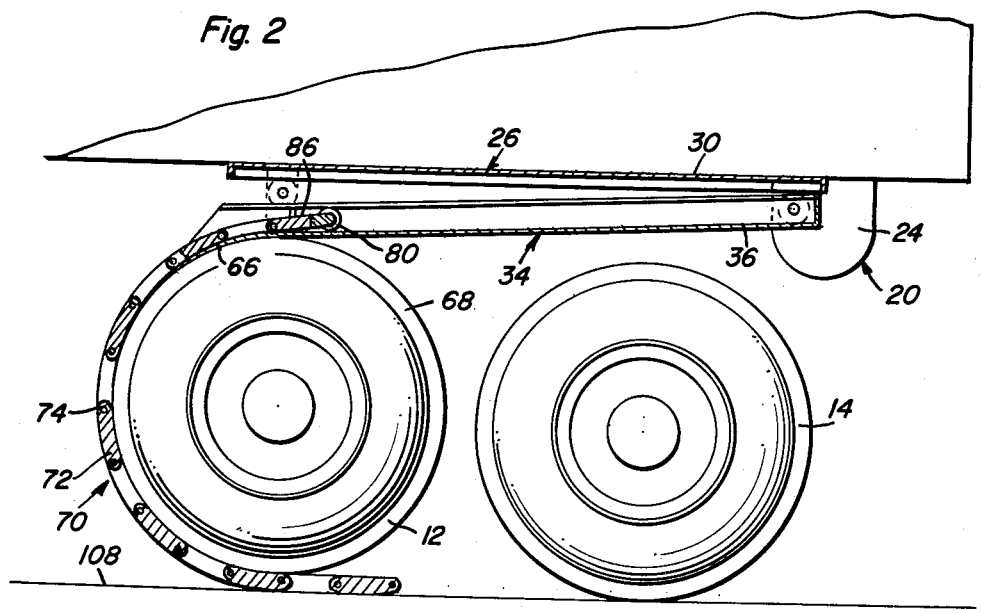
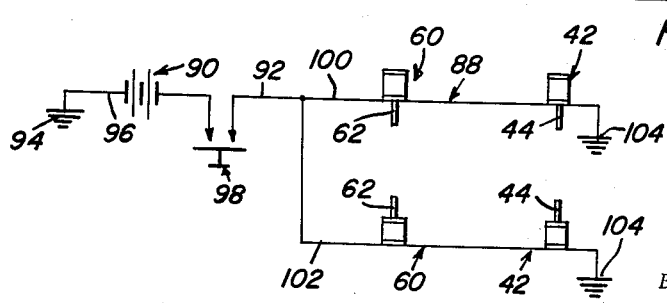
Andrew S. Shea
INVENTOR.

Feb. 26, 1963 A. S. SHEA 3,078,963
EMERGENCY BRAKE
Filed Oct. 20, 1961
2 Sheets-Sheet 2
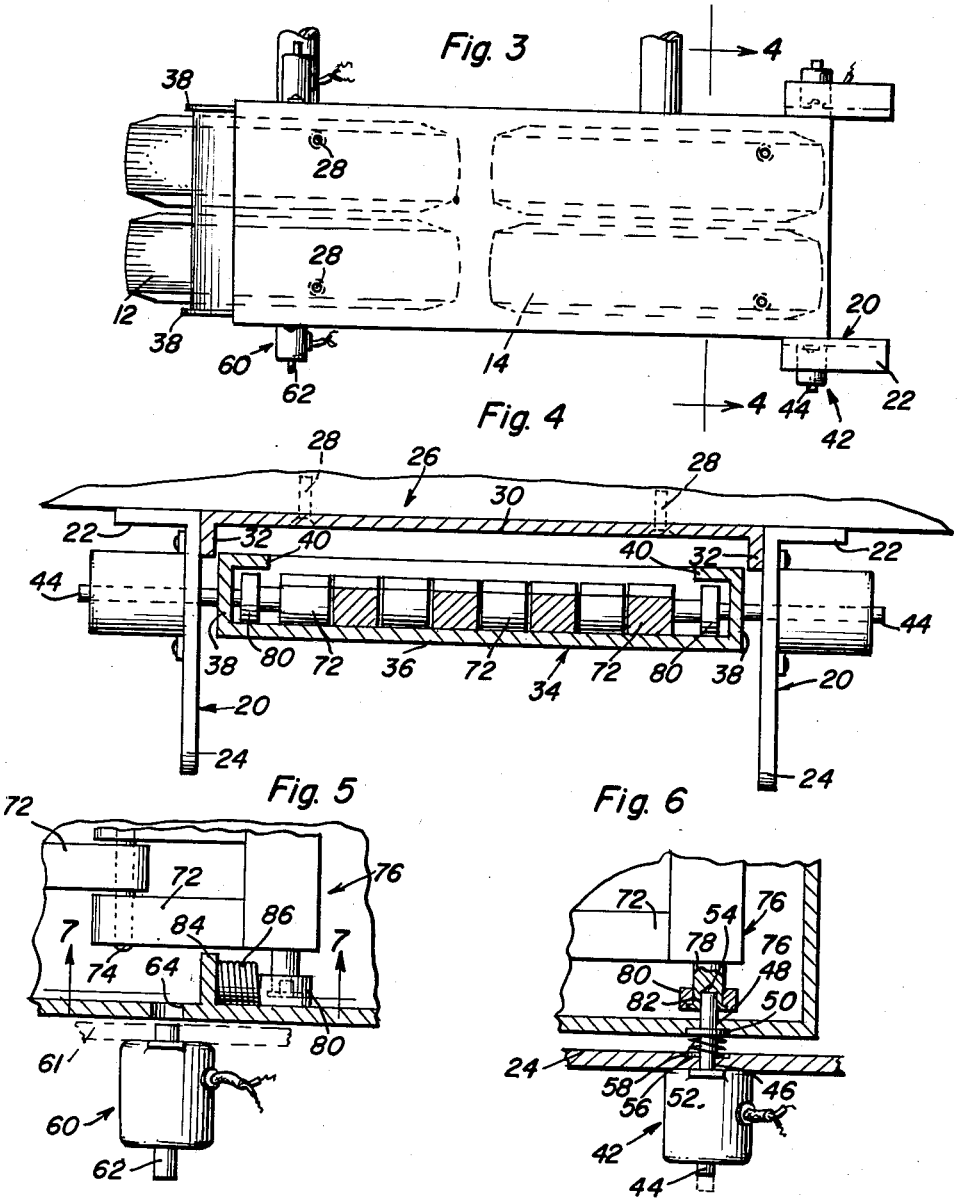
Andrew S. Shea
INVENTOR.
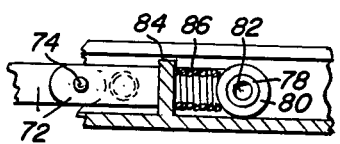
Attorneys United States Patent Office 3,078,963
Patented Feb. 26, 1963

3,078,963
EMERGENCY BRAKE
Andrew S. Shea, 171 N. Diamond St., Mount Pleasant, Pa.
Filed Oct. 20, 1961, Ser. No. 146,574
3 Claims. (Cl. 188—4)

This invention relates to a novel and useful emergency brake and more specifically to an emergency brake of the skid type including an elongated flexible skid member which may be secured at one end by means of a lost motion connection to a vehicle body by means of support means from which it may be extended to a position underneath a support wheel of the vehicle thereby creating a drag and bringing the vehicle to a stop.

While various types of emergency brake mechanisms have heretofore been designed, most have relied upon portions of the running gear of a vehicle other than the vehicle wheels for stopping the vehicle. Some emergency brakes are provided for engagement with various portions of the drive train of a vehicle and are most effective unless there is a failure of the drive train between the emergency brake mechanism and the support wheels of the vehicle. If such a failure does occur, the support wheels of the vehicle are then free wheeling and incapable of stopping forward movement of the vehicle.

Accordingly, it is the main object of this invention to provide an emergency brake assembly for a wheeled vehicle which will rely solely upon the rolling contact of one or more of the vehicle wheels with the supporting surface therefor after the emergency brake has been properly actuated. In this manner, emergency brake failures will be substantially eliminated.

A further object of this invention, in accordance with the immediately preceding object, is to provide an elongated flexible skid member and means for supporting the flexible skid member from the frame of a vehicle in a manner whereby one end of the skid member may be longitudinally extended from a retracted inoperative position to a position forwardly of one of the supporting wheels of a vehicle and in contact with the surface over which the vehicle is rolling whereby the forward movement of the associated support wheel of the vehicle will wedge the free end of the elongated skid member between that support wheel and its supporting surface.

A still further object of this invention is to provide a support tray for supporting the skid member which may be conveniently supported above an associated ground engaging wheel of a vehicle with the tray extending longitudinally of the vehicle and the forward end thereof slightly downwardly inclined so that the skid member may be disposed on the tray and normally urged to an extended position by gravity. In this manner, means for retaining the elongated skid member in a retracted position may be disengaged from the skid member and gravity will pull the skid member to an extended operative position.

A further object of this invention, in accordance with the immediately preceding object, is to provide a support tray having its rear end pivotally mounted on a vehicle frame for movement about a transversely extending and horizontally disposed axis in order that the forward end of the tray may be pivoted from between a substantially horizontally disposed position and a forwardly and downwardly inclined position.

Another object of this invention is to provide a means for releasably retaining the forward end of the tray in a horizontally disposed position whereby the retaining means may be released and the force of gravity may be utilized to urge the forward end of the tray toward a downwardly inclined position from which the skid member will readily slide toward an extended position.

Another object of this invention, in accordance with the immediately preceding object is to provide a means for mounting the forward end of the support tray directly above the associated ground engaging wheel of a vehicle whereby as the forward end of the tray is released and allowed to drop to a forwardly and downwardly inclined position it will rest upon the upper surface of the associated tire or wheel thus enabling the tire or wheel to impart a vibratory motion to the tray which will in turn facilitate the sliding movement of the flexible skid member supported thereby toward an extended position.

A final object to be specifically enumerated herein is to provide an emergency brake assembly in accordance with the immediately preceding objects which will conform to conventional forms of manufacture, be of simple construction and easy to use so as to provide a device that will be economically feasible, long lasting and relatively trouble free in operation.

These together with other objects and advantages which will subsequently become apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of the rear portion of a vehicle body shown with the emergency brake assembly of the instant invention mounted thereon;

FIGURE 2 is a fragmentary side elevational view similar to that of FIGURE 1 but showing the emergency brake assembly in vertical section;

FIGURE 3 is a fragmentary top plan view of the emergency brake assembly;

FIGURE 4 is an enlarged transverse vertical sectional view taken substantially upon the plane indicated by the section line 4—4 of FIGURE 3;

FIGURE 5 is an enlarged horizontal sectional view showing the manner in which the support tray for the flexible skid member may be released to assume a forwardly and downwardly inclined position and the manner in which the flexible skid member has one end secured to the support tray by means of a lost motion connection and is prevented from being fully extended from the support tray;

FIGURE 6 is an enlarged fragmentary horizontal sectional view taken substantailly upon the plane indicated by the section line 6—6 of FIGURE 1;

FIGURE 7 is a fragmentary vertical sectional view taken substantially upon the plane indicated by the section line 7—7 of FIGURE 5; and FIGURE 8 is a diagrammatic view of an electrical circuit for operating the emergency brake assembly.

Referring now more specifically to the drawings the numeral 10 generally designates a conventional type of wheeled vehicle which includes ground engaging wheels 12 and 14 and a frame body generally referred to by the reference numeral 16.

The emergency brake assembly of the instant invention is generally referred to by the reference numeral 18 and includes a pair of rear inverted L-shaped brackets generally referred to by the reference numeral 20. The brackets 20 each includes a horizontal leg 22 and a vertical leg 24 and it will be noted that each of the horizontal legs 22 is fixedly secured to the body 16 in any convenient manner. A cover plate generally referred to by the reference numeral 26 is also secured to the body 16 in any convenient manner such as by fasteners 28 and includes an upper wall 30 and a pair of opposite side depending flanges 32. The cover 26 is disposed between the mounting brackets 20 and the outside surfaces of the depending flanges 32 are disposed in surface-to-surface contacting relation with the inner surfaces of the vertical legs 24.

A support tray generally referred to by the reference numeral 34 is provided and includes a bottom wall 36 and a pair of upwardly directed opposite side flanges 38 which each terminate at their upper ends in an inturned flange 40.

With attention now directed to FIGURES 1, 3, 4 and 6, it will be noted that each of the vertical legs 24 has an electric solenoid generally referred to by the reference numeral 42 secured thereto in any convenient manner. Each of the solenoids 42 includes an armature shaft 44 and each armature shaft projects inwardly through a bore 46 formed in the corresponding vertical leg 24. Each of the side flanges 38 also includes a bore 48 which is aligned with the corresponding bore 46 and the outer end of each bore 48 includes a counterbore 50. Additionally, it will be noted that the inner end of each bore 46 includes a counterbore 52. Each of the armature shafts 44 projects through the corresponding bores 46 and 48 and extends a spaced distance inwardly of the corresponding support flange 38 and terminates in a conical tip 54.

A washer 56 is seated in each counterbore 50 and a compression spring 58 has one end engaged with the outer face of the corresponding washer 56 and the other end seated in the corresponding counterbore 52. The washer 56 is secured to the corresponding armature shaft 44 whereupon the armature shaft 44 is normally urged to an innermost limit position defined by the counterbore 50 in which the washer 56 is receivable.

In addition, it will be noted that a pair of electric solenoids generally referred to by the reference numeral 60 are carried by front mounting brackets 61 which are secured to the body 16 and the outer surfaces of the forward ends of the depending flanges 32. Each of the solenoids 60 also includes an armature shaft which is referred to by the reference numeral 62 and each of the side flanges 38 is provided with a bore 64 which is registrable with the inner end of the corresponding armature shaft 62.

Accordingly, it may be observed from FIGURE 1 of the drawings that the support tray 34 has its rear end pivotally secured to the mounting bracket 20 for movement about a horizontally disposed axis extending transversely of the vehicle 10 and that the forward end of the support tray may be swung from an upper horizontally disposed inoperative positon to forwardly and downwardly inclined operative position with the forward end of the bottom wall 36 which has a curved forward end portion 66 disposed in contacting relation with the tread surface 68 of the wheel 12. In this manner, the forward end of the support tray 44 may be dropped to an operative position and vibrated by the tread surface 68 of the tire or wheel 12 rubbing thereagainst upon rotation of the wheel 12.

An elongated and flexible skid member generally referred to by the reference numeral 70 is provided and includes a plurality of link sections 72 which are pivotally secured by means of pivot shafts 74 in longitudinally spaced and transversely staggered relation. A retaining bar generally referred to by the reference numeral 76, see FIGURES 5 and 6, is carried by the rear end of the elongated flexible skid member 70 and a shaft 78 extends through the retaining bar 76 and is provided with a roller 80 on each of its opposite ends. Each of the rollers 80 is disposed in rolling contact relation with the upper surface of the bottom wall 36 and it will be noted that the opposite ends of the shaft 78 are each provided with a blind bore 82 in which the corresponding armature shaft 44 is receivable. Accordingly, when the armature shafts 44 are positioned as illustrated in FIGURE 6 of the drawings with their innermost ends disposed in the blind bores 82, the elongated flexible skid member 70 is retained in a retracted and inoperative position. However, the solenoids 42 may be simultaneously actuated as will hereinafter become apparent in order to retract the inner ends of the armature shafts 44 from engagement with the opposite ends of the shaft 78 whereupon the elongated flexible skid member 70 will be free to slide forwardly along the bottom wall 36 of the support tray 34.

With attention now directed to FIGURE 5 of the drawings it will be seen that each of the side flanges 38 of the support tray 34 is provided with an inwardly directed abutment flange 84 and that a compression spring 86 is secured to the rear surface of each abutment flange 84. Additionally, it may be observed from FIGURE 5 that upon forward movement of the elongated flexible skid member 70, the rollers 80 will be moved into engagement with the rear ends of the compression springs 86. Accordingly, forward movement of the elongated flexible skid member 70 is limited by the abutment flange 84 and it may also be observed that the springs 86 serve as shock absorber means to absorb the stopping shock of the skid member 70.

With attention now directed to FIGURE 8 of the drawings there will be seen a wiring circuit generally referred to by the reference numeral 88 which includes a battery generally referred to by the reference numeral 90 and a main wire 92 which extends from one side of the battery. The other side of the battery is connected to a ground 94 by means of wire 96 and the wire 92 has an on-off switch 98 disposed therein. A pair of branch wires 100 and 102 each have one end secured to the main wire 92 and the other end secured to a ground 104. Each of the branch wires 100 and 102 has the corresponding pair of solenoids 42 and 60 disposed therein. Accordingly, it may be seen that all of the solenoids 42 and 60 may be simultaneously actuated by closing of the on-off switch 98.

Upon actuation of the on-off switch 98 to the closed position, the armature shaft 62 will be retracted to the position illustrated in FIGURE 5 of the drawings whereupon the forward end of the support tray 34 will drop downwardly and into frictional engagement with the tread surface 68 of the wheel 12. Rotation of the wheel 12 beneath the curved portion 66 of the bottom wall 36 will impart a vibratory motion to the support tray 34 and simultaneously with the retraction of the armature shaft 62 the armature shaft 44 will also be retracted. Thus, the inner ends of the armature shaft 44 will be retracted from engagement with the blind bores 82 formed in the opposite ends of the shaft 78 whereupon the skid member 70 will be free to slide forwardly and downwardly and out of the open forward end of the support tray 34. Just before the rollers 80 engage the compression springs 86, the free end of the skid member 70 will pass between the wheel 12 and the supporting surface 108 and as can be viewed in FIGURE 2 of the drawings, by the time the rollers 80 engage the compression spring 86 to prevent further movement of the skid member 70 outwardly of the forward end of the support tray 34, the free end of the skid member 70 will be disposed entirely beneath the wheel 12 and between the latter and the support surface 108. Therefore, it may be seen that the skid member 70 may be readily used as an emergency brake to effect a drag opposing forward movement of the vehicle 10.

After the skid member 70 has once been extended to operative position and engaged between the wheel 12 and the support surface 108, after the vehicle 10 has been stopped it may be moved rearwardly a distance sufficient to free the free end of the skid member 70 whereupon the skid member 70 may then be repositioned into a retracted position within the support tray 34. As the skid member 70 is being moved toward a retracted position, the armature shaft 44 may be either manually or electrically retracted in order that the conical end portion 54 of each may be received in the corresponding blind bore 82. Then, the armature shaft 62 may also be electrically or manually retracted and subsequently released after the forward end of the support tray 34 has been pivoted to a horizontally disposed position with the armature shaft 62 in alignment with the bores 64.

It will be noted that the vehicle 10 is provided with tandem rear wheels 12 and 14 and that the skid member 70 may be extended only to a position under the wheels 12. While it may be made of a length to extend under the wheels 14, by limiting it to use with the wheels 12, the wheels 14 still have rolling contact with the surface 108 and will thus prevent the rear end of the vehicle from skidding and sliding in an uncontrollable manner.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination, a vehicle having a frame and a ground engaging support wheel, an emergency brake comprising an elongated support tray, means pivotally mounting said support tray at one end to said vehicle frame for movement about a horizontal axis disposed above and rearwardly of said support wheel and extending transversely of said tray and vehicle, the free end of said tray being open, disposed forwardmost relative to said vehicle wheel and freely swingable between a raised position with said tray substantially horizontally disposed and a lowered forwardly downwardly inclined position with the undersurface of said tray engaging the upper periphery of said support wheel, an elongated flexible skid member freely longitudinally slidable on said tray between a retracted inoperative position disposed on said tray and an extended position having one end projecting outwardly of the free end of said tray and disposed beneath said support wheel upon lowering of the free end of said tray, first and second coacting abutment means carried by said tray and skid for limiting extension of said skid member outwardly of said one end of said tray, first means releasably securing said skid member in the retracted position relative to said tray and second means releasably securing said tray in said raised position, said tray including upwardly directed opposite side flanges extending longitudinally therealong, supporting brackets secured to said vehicle frame and extending along and embracing the opposite sides of said tray, a pair of transversely aligned bores formed in said opposite side flanges adjacent their rear ends, a pair of pivot shafts supported from said flanges, extending transversely thereof and axially shiftable relative to said flanges, the adjacent ends of said pivot pins being receivable through said bores and engageable with socket means carried by the other end of said flexible member, opening in opposite directions and registrable with said bores, said pivot pins comprising said means releasably securing said skid member in the retracted position and said means pivotally mounting said support tray to said vehicle frame.

2. The combination of claim 1 wherein said first and second means include a common actuator whereby said tray and skid member may be simultaneously released.

3. The combination of claim 1 wherein said abutment means for limiting extension of said skid member includes shock absorbing means.

References Cited in the file of this patent

UNITED STATES PATENTS

| | | |
|---|---|---|
| 2,191,954 | Buffa | Feb. 27, 1940 |
| 2,410,592 | Wread | Nov. 5, 1946 |
| 2,605,860 | Smith | Aug. 5, 1952 |
| 2,887,185 | Lee | May 19, 1959 |

FOREIGN PATENTS

| | | |
|---|---|---|
| 173,329 | Austria | Dec. 10, 1952 |